July 15, 1958  E. PASCHOLD  2,842,798
INJECTION MOLDING DEVICE FOR THERMOPLASTIC MATERIALS
Filed Jan. 29, 1957  3 Sheets-Sheet 1

INVENTOR
Ernst Paschold
By Ernest J. Montague
Attorney

July 15, 1958 E. PASCHOLD 2,842,798
INJECTION MOLDING DEVICE FOR THERMOPLASTIC MATERIALS
Filed Jan. 29, 1957 3 Sheets-Sheet 2

INVENTOR

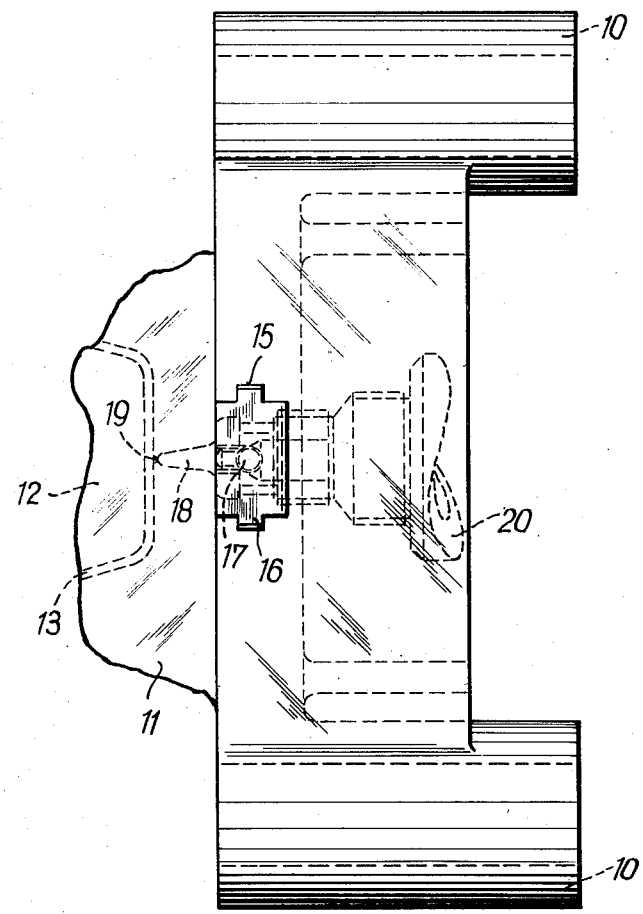

United States Patent Office 2,842,798
Patented July 15, 1958

2,842,798

INJECTION MOLDING DEVICE FOR THERMOPLASTIC MATERIALS

Ernst Paschold, Schwelm, Westphalia, Germany, assignor to Gerdes & Co., Schwelm, Westphalia, Germany, a corporation of Germany Application January 29, 1957, Serial No. 636,907

Claims priority, application Germany February 18, 1956

4 Claims. (Cl. 18—30)

The present invention relates to an injection molding device for thermoplastic materials.

It is known that during the injection molding of workpieces of thermoplastic materials a sprue is formed, which as a rule is of conical or similar shape and which must be separated from the finished workpiece. Mostly a sprue is created, the base of which seats on the workpiece. Such sprue has the drawback, however, that upon injection of the finished workpiece, the conical sprue must be removed by additional labor. Furthermore such conical sprue causes in case of thin walled parts longer after pressure and waiting periods.

It is also known to eject through a remaining sprue. In this case advantage is taken of the fact that the conical sprue remains sufficiently plastic inside thereof, to press the hot thermoplastic material through the sprue which is hardened on the outside yet still semi-liquid on its inside. This method has, however, only limited applications.

Injection molding is often worked in such manner that a point-shaped sprue is formed, in which the base of the conical sprue is disposed opposite the injection nozzle and the apex of the conical sprue is in connection with the workpiece by means of a short, needle-thin ridge. Upon opening of the mold the point-like sprue is broken off the workpiece, so that no additional labor is required, while the sprue itself is withdrawn with the injection part of the device.

This point-like sprue has appreciable advantages, since the workpiece is injected in finished form. It happens, though, that the sprue does not fall off. This brings about the danger, that at the next injection cycle, that means during the next forward stroke of the injection device, the sprue prevents the closing of the device. It was, therefore, necessary to have the sprue removed by a worker in nearly all instances.

It is, therefore, one object of the present invention to provide an injection molding device designed to work with a point-like sprue wherein the sprue separated from the workpiece is safely removed without any labor or workman.

It is another object of the present invention to provide an injection molding device designed to work with a point-like sprue wherein a movable, for instance slidable, ejector is provided, which during the opening of the injection device passes by the nozzle and closes the latter during the inoperative period of the device in its open position, in which case the nozzle is preferably equipped with a set-off disposed advantageously closely behind its mouth.

It is yet another object of the present invention to provide an injection molding device designed to work with a point-like sprue wherein a movable ejector is provided which passes by the nozzle mouth after each injection cycle, and shears off the sprue from the nozzle mouth. The ejector closes simultaneously the nozzle during the entire inoperative, open period of the device. Not before the next injection period starts, returns the ejector into its original, inoperative position, thereby, releasing the nozzle.

It is also an object of the present invention to provide an injection molding device designed to work with a point-like sprue wherein a movable ejector is provided for the ejection of the sprue which ejector is of a thickness equal to the length of the stroke of the injection nozzle relative to the injection part of the device. The length of the stroke corresponds with the length of the conical sprue. In this manner, the ejector is easily yet fittingly movable between the base of the device and the nozzle.

It is also a further object of the present invention to provide an injection molding device of the type defined above, wherein the nozzle itself has a plane surface in order to achieve a good sealing with the ejector, whereby it is of advantage to provide the nozzle with a slightly conical facet, in order to simplify the riding of the ejector onto the end face of the nozzle.

It is yet a further object of the present invention to provide an injection molding device of the type defined above, wherein means for mechanical control of the ejector is provided; it is, however, also desirable to provide electrically operated control means, advantageously with a time control, so that the movement of the ejector may be made responsive exactly to the opening and closing movement, respectively, of the device.

It is also of advantage to provide electrical means which check the movement of the ejector and which stop the injection molding device if the ejector, for instance by an obstacle or the like, does not correctly shear off the sprue and does not reach its final operative position in which the nozzle is locked. It is further of advantage to provide locking means, preferably electrical means, which permit of start of the closing movement of the injection molding device only after the ejector has reached its inoperative position.

With these and other objects in view which will become apparent in the following detailed description, the present invention will be clearly understood in connection with the accompanying drawings, in which:

Fig. 3 is a top plan view of the device shown in Fig. 1.

Figure 1:
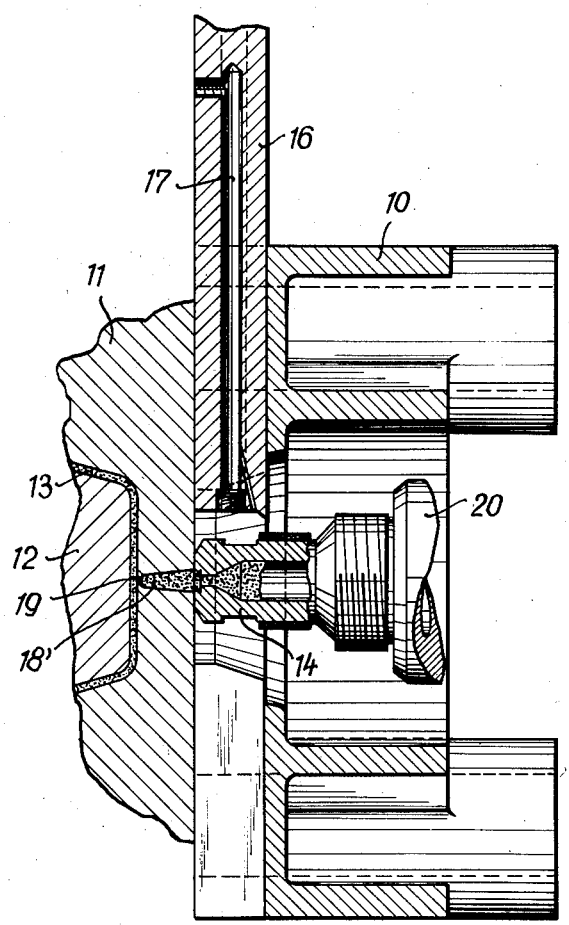
Figure 1 is a fragmentary section of an injection molding device in operative injecting position.
Figure 2:
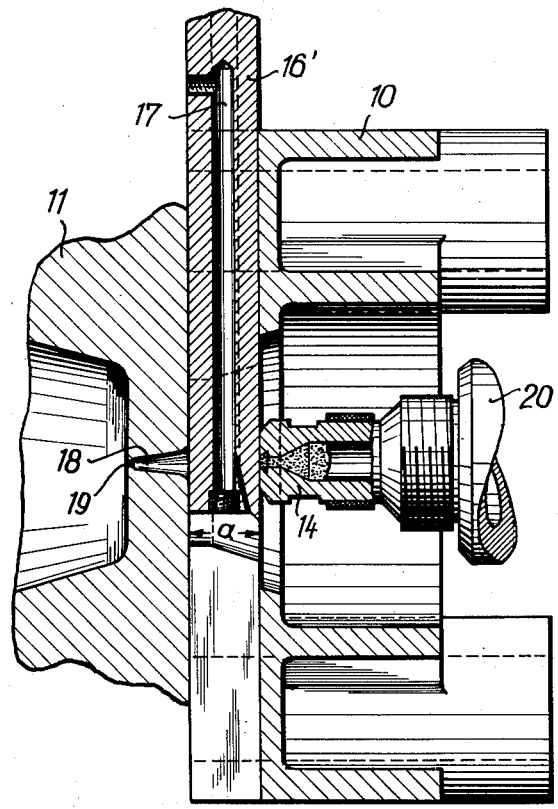
Fig. 2 is a fragmentary section of the injection molding device, shown in Fig. 1, in inoperative position.

Referring now to the drawings, the so called device plate 10 carries the outer mold and the injection part 11, respectively, the latter forming together with the inner mold 12 the tool 11, 12 for the molded product 13. The nozzle 14 has an end face which is plane at its center, while its edge portions are conically formed backwardly and form a facet. The mouth of the nozzle 14 is set off inside thereof.

A vertical guide 15 (Fig. 3) is provided in the device plate 10 in which guide 15 a slide-like ejector 16 is movably mounted. The ejector 16 has an air-blow channel 17 which terminates at its lower end face. The ejector 16 has further at the side adjacent the nozzle 14 an inclined, knife-like face.

In the position of the device shown in Fig. 1 the molded product 13 is formed. Thermoplastic material is injected through the nozzle 14 as well as through a channel 18 of the tool base 11, whereby a conically shaped sprue 18' is formed, the base of which is opposite the nozzle 14, while the apex of the sprue 18' remains in connection with the mold by means of a needle-thin thread 19.

In order to eject the formed workpiece, the tool is opened. During this operation the point-like sprue is torn off the molded product 13. In addition, the nozzle 14 performs a return stroke $a$ relative to the device plate 10, the nozzle 14 carrying with it the sprue 18' due to its inner set off. If the nozzle 14 reaches its rearmost position, the ejector 16 moves downwardly, simultaneously removing the sprue 18' from the nozzle 14 and closing the latter.

At the end of the inoperative period of the nozzle 14, the ejector is moved upwardly into its original or inoperative position, so that the injection device may assume again its operative, injecting position. It is to be understood, that the movement of the nozzle 14 is merely relative to the injection part 11, since devices are also known in which the nozzle 14 moves together with the cylinder 20 relative to the device plate 10, yet devices are also known, in which the nozzle with the cylinder stands still and the device plate performs the stroke $a$ in the opposite direction.

The blowing air, which is fed through the channel 17 of the ejector 16, supports and accelerates the ejection of the sprue.

Locking means (not shown) may be provided, which prevent the relative movement of the nozzle 14, if the ejector 16 does not return into its original or inoperative position. Further means are desirable for stopping the device, if the ejector 16 does not assume its operative ejecting position, and, thus, does not shear off and eject the sprue.

The movement and control of the ejector 16 and of locking means of the device may be achieved by mechanically, pneumatically, hydraulically or electrically operated means. Particularly advantageous is an electrical control device, since it is thus possible to combine the operating means for the ejector 16 and the locking means in simple and safe manner.

A secure push-button control may be arranged for the movement of the ejector 16.

Instead of guiding the ejector 16 in the device plate 10, it is possible to provide guides or the like in front of the device plate 10 or in the injection part 11 (not shown). The arrangement of the guides in the injection part 11 is, however, not economical, since a special ejector must be provided for each tool. This arrangement may be also of advantage, however, and particularly in the case of multiple sprues or sprue stars.

The ejector 16 must not necessarily perform a linear movement, rather a swinging or turning movement may be arranged instead. The device is also operative with other types of sprues than those shown by example in the drawings. Particularly in the latter case the ejector 16 may function merely as a closure device for the nozzle 14. On the other hand, the ejector 16 may be rendered permanently inoperative, if it is not required upon operation with certain thermoplastic materials.

While I have disclosed one embodiment of the present invention, it is to be understood that this embodiment is given by example only and not in a limiting sense, the scope of the present invention being determined by the objects and the claims.

I claim:

1. In an injection molding device for thermoplastic materials, an injection member having a nozzle on one end, a mold including an injection part having a recess adapted to form a sprue the base of which is disposed opposite said nozzle and said injection part having a needle-thin channel connecting the apex of said sprue with said mold, said nozzle being axially movable relative to said injection part, and an ejector disposed between said injection part and said nozzle when the latter is in its withdrawn inoperative position, and means for moving said ejector in front of the mouth of said nozzle, in order to shear off by means of said ejector said sprue and to close the mouth of said nozzle in the inoperative position of the latter.

2. The injection molding device, as set forth in claim 1, wherein the said nozzle has a substantially plane end face and a substantially conically shaped facet formation surrounding said end face.

3. The injection molding device, as set forth in claim 1, wherein the said ejector has a longitudinal channel adapted to feed air toward said sprue.

4. The injection molding device, as set forth in claim 1, wherein said ejector has a thickness measured in axial direction of said nozzle which equals the stroke of the latter relative to the base of said injection part of said mold from its operative position to its inoperative position.

References Cited in the file of this patent

UNITED STATES PATENTS

| | | |
|---|---|---|
| 2,436,122 | Rotsler | Feb. 17, 1948 |
| 2,686,934 | D'Amore | Aug. 24, 1954 |
| 2,739,349 | Strauss | Mar. 27, 1956 |